United States Patent
Suzuki et al.

(10) Patent No.: US 11,481,971 B2
(45) Date of Patent: Oct. 25, 2022

(54) INFORMATION PROCESSING METHOD, INFORMATION PROCESSING SYSTEM, AND PROGRAM

(71) Applicant: LINKWIZ INCORPORATED, Shizuoka (JP)

(72) Inventors: Motofumi Suzuki, Shizuoka (JP); Fumio Ikegaya, Shizuoka (JP)

(73) Assignee: LINKWIZ INCORPORATED, Shizuoka (JP)

( * ) Notice: Subject to any disclaimer, the term of this patent is extended or adjusted under 35 U.S.C. 154(b) by 0 days.

(21) Appl. No.: 17/559,677

(22) Filed: Dec. 22, 2021

(65) Prior Publication Data

US 2022/0207823 A1 Jun. 30, 2022

(30) Foreign Application Priority Data

Dec. 25, 2020 (JP) .............................. JP2020-217246

(51) Int. Cl.
*G06T 17/00* (2006.01)
*G06T 7/50* (2017.01)
(Continued)

(52) U.S. Cl.
CPC ............... *G06T 17/00* (2013.01); *G06T 7/50* (2017.01); *G06T 7/70* (2017.01); *G06T 19/20* (2013.01);
(Continued)

(58) Field of Classification Search
CPC .. G06T 17/00; G06T 7/50; G06T 7/70; G06T 19/20; G06T 2200/08; G06T 2207/10024;
(Continued)

(56) References Cited

U.S. PATENT DOCUMENTS

2005/0195211 A1* 9/2005 Park ..................... H04N 9/73
348/E9.04

FOREIGN PATENT DOCUMENTS

| JP | H01102305 A | 4/1989 |
| JP | 2000207557 A | 7/2000 |

(Continued)

OTHER PUBLICATIONS

Machine translation of JP2018169344. (Year: 2018).*
(Continued)

*Primary Examiner* — Sing-Wai Wu

(57) ABSTRACT

An objective of the present invention is to substantially enable fitting without using a reference object model being three-dimensional point cloud data directly for fitting and enable comparison between an actual object model and the reference object model. There is provided an information processing method that is a principal aspect of the present invention, the information processing method including: a step of acquiring reference three-dimensional model data from a reference object with a sensor; a step of acquiring, by a reference-point-coordinate acquisition unit, any number of pieces of reference-point-coordinate information from the reference three-dimensional model data, the any number being three or more; a step of acquiring corresponding three-dimensional model data from a measurement object with the sensor; a step of setting, by a reference-search-range setting unit, a reference search range based on the reference-point-coordinate information; and a step of acquiring, by a corresponding-point-coordinate-information acquisition unit, corresponding-point-coordinate information within the reference search range, in the corresponding three-dimensional model data.

8 Claims, 15 Drawing Sheets

(51) Int. Cl.
  *G06T 7/70*    (2017.01)
  *G06T 19/20*   (2011.01)
(52) U.S. Cl.
  CPC .................. *G06T 2200/08* (2013.01); *G06T 2207/10024* (2013.01); *G06T 2207/10028* (2013.01); *G06T 2207/20092* (2013.01); *G06T 2219/2012* (2013.01)
(58) Field of Classification Search
  CPC . G06T 2207/10028; G06T 2207/20092; G06T 2219/2012
  See application file for complete search history.

(56) References Cited

FOREIGN PATENT DOCUMENTS

| | | | |
|---|---|---|---|
| JP | 2005519277 A | 6/2005 | |
| JP | 2018169344 A | 11/2018 | |
| JP | 2020042476 A | 3/2020 | |
| WO | WO-03074968 A1 * | 9/2003 | ........... G01B 11/005 |
| WO | 2020179439 A1 | 9/2020 | |

OTHER PUBLICATIONS

Notice of Reasons for Refusal dated May 13, 2021 for related Japanese Patent Application No. 2020-217246.
Notice of Reasons for Refusal dated Mar. 25, 2021 for related Japanese Patent Application No. 2020-217246.

* cited by examiner

40

40

4 1

60

INFORMATION PROCESSING METHOD, INFORMATION PROCESSING SYSTEM, AND PROGRAM

BACKGROUND OF THE INVENTION

Field of the Invention

The present invention relates to an information processing method, an information processing system, and a program.

Description of the Related Art

A technique in which a reference object model is created beforehand by scanning an object (e.g., a work), an actual object model is created by scanning an actual object, and a misregistration is corrected in accordance with a result of comparison with the reference object model has been known. For example, Japanese Unexamined Patent Application Publication No. 2000-207557 describes a technique for determining an amount of misregistration by comparing a reference image and an input image with each other.

As above, even when a position of an actual object is displaced from an expected position, storing a reference object model enables determination of a displacement from an actual object model and correction of this displacement (what is called fitting), thus enabling accurate operation by using the actual object model. However, for example, in a case where three-dimensional point cloud data is used as an object model, it is necessary to search for a corresponding point data item in a reference object model for each point data item in an actual object model because the three-dimensional point cloud data is merely a set of point data items. Therefore, shapes of both models need to be the same or similar to each other so that fitting is feasible.

That is, for example, to compare shapes using both models, the shape of the actual object model needs to fall within a range of shape changing with respect to the reference object model to an extent that fitting is feasible, or further interpolation can be needed for the fitting.

The present invention has been made in view of such circumstances and has an objective to provide a technique capable of substantially enabling fitting without using a reference object model being three-dimensional point cloud data directly for fitting and enabling comparison between an actual object model and the reference object model.

SUMMARY OF THE INVENTION

A principal aspect of the present invention for solving the above problem is an information processing method including: a step of acquiring reference three-dimensional model data from a reference object with a sensor; a step of acquiring, by a reference-point-coordinate acquisition unit, any number of pieces of reference-point-coordinate information from the reference three-dimensional model data, the any number being three or more; a step of acquiring corresponding three-dimensional model data from a measurement object with the sensor; a step of setting, by a reference-search-range setting unit, a reference search range based on the reference-point-coordinate information; and a step of acquiring, by a corresponding-point-coordinate-information acquisition unit, corresponding-point-coordinate information within the reference search range, in the corresponding three-dimensional model data.

In addition, a problem and solution to the problem to be disclosed in the present application will be clarified through embodiments and drawings of the invention.

According to the present invention, it is possible to substantially enable fitting without using a reference object model being three-dimensional point cloud data directly for fitting and enable comparison between an actual object model and the reference object model.

DETAILED DESCRIPTION OF THE PREFERRED EMBODIMENTS

Figure 1:
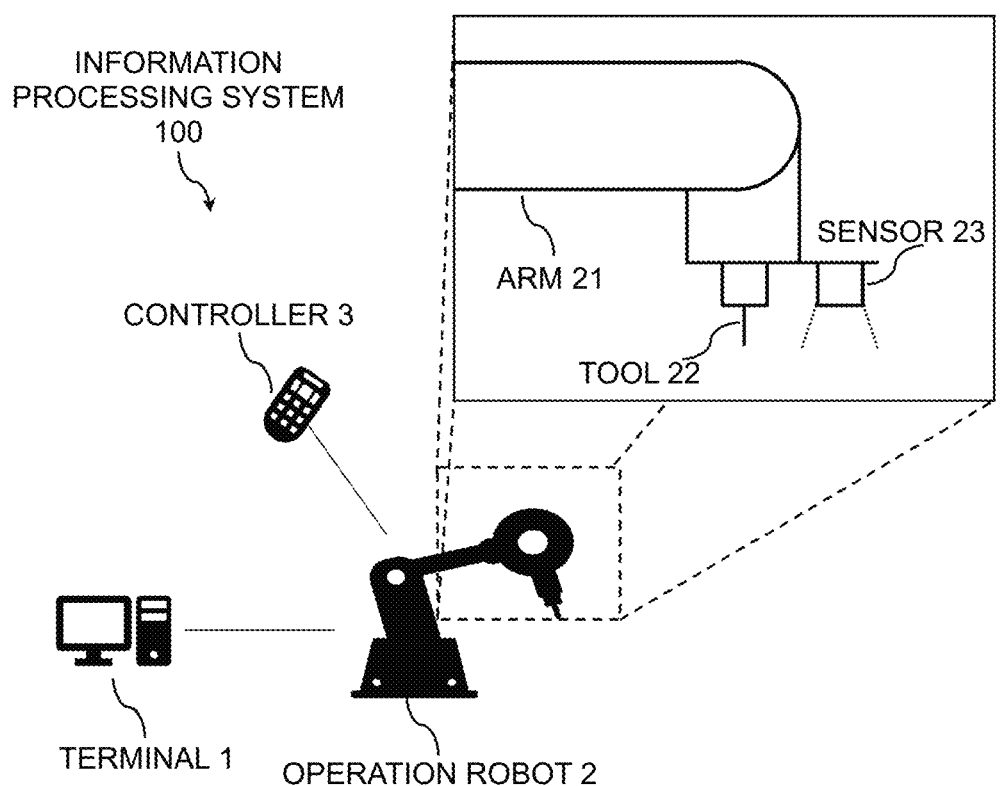
FIG. 1 is a diagram illustrating a general configuration example of an information processing system 100 in Embodiment 1 being the present embodiment.

First, contents of embodiments of the present invention will be listed and described. The present invention has, for example, the following configuration.

[Item 1]

An information processing method including:

a step of acquiring reference three-dimensional model data from a reference object with a sensor;

a step of acquiring, by a reference-point-coordinate acquisition unit, any number of pieces of reference-point-coordinate information from the reference three-dimensional model data, the any number being three or more;

a step of acquiring corresponding three-dimensional model data from a measurement object with the sensor;

a step of setting, by a reference-search-range setting unit, a reference search range based on the reference-point-coordinate information; and a step of acquiring, by a corresponding-point-coordinate-information acquisition unit, corresponding-point-coordinate information within the reference search range, in the corresponding three-dimensional model data.

[Item 2]

The information processing method according to Item 1, in which the three-dimensional model data is three-dimensional point cloud data.

[Item 3]

The information processing method according to Item 1 or 2, in which the step of acquiring the reference-point-coordinate information includes a step of detecting, by a specific-shape-portion detection unit, a portion with a specific shape in the reference three-dimensional model data to acquire coordinate information on the portion as reference-point-coordinate information.

[Item 4]

The information processing method according to any one of Items 1 to 3, further including a step of calculating, by a reference-point-coordinate-plane calculation unit, a reference plane that includes the reference point coordinates in the reference three-dimensional model data; and a step of making, by a reference-plane-difference-value-information acquisition unit, a setting such that the reference plane has a reference value in a predetermined coordinate axis direction and acquires pieces of reference-difference-value information indicating difference values, from the reference value, of the reference three-dimensional model data with respect to the reference plane in the predetermined coordinate axis direction.

[Item 5]

The information processing method according to any one of Items 1 to 3, further including a step of calculating, by a corresponding-point-coordinate-plane calculation unit, a corresponding plane that includes the corresponding point coordinates in the corresponding three-dimensional model data; and a step of making, by a corresponding-plane-difference-value-information acquisition unit, a setting such that the corresponding plane has a reference value in a predetermined coordinate axis direction and acquires pieces of corresponding-difference-value information indicating difference values, from the reference value, of the corresponding three-dimensional model data with respect to the corresponding plane in the predetermined coordinate axis direction.

[Item 6]

The information processing method according to any one of Items 1 to 3, further including a step of calculating, by a reference-point-coordinate-plane calculation unit, a reference plane that includes the reference point coordinates in the reference three-dimensional model data; and a step of making, by a reference-plane-difference-value-information acquisition unit, a setting such that the reference plane has a reference value in a predetermined coordinate axis direction and acquires pieces of reference-difference-value information indicating difference values, from the reference value, of the reference three-dimensional model data with respect to the reference plane in the predetermined coordinate axis direction;

a step of calculating, by a corresponding-point-coordinate-plane calculation unit, a corresponding plane that includes the corresponding point coordinates in the corresponding three-dimensional model data; and a step of making, by a corresponding-plane-difference-value-information acquisition unit, a setting such that the corresponding plane has a reference value in a predetermined coordinate axis direction and acquires pieces of corresponding-difference-value information indicating difference values, from the reference value, of the corresponding three-dimensional model data with respect to the corresponding plane in the predetermined coordinate axis direction.

[Item 7]

The information processing method according to Item 6, further including a step of comparing, by a difference-value-information comparison unit, pieces of reference-difference-value information and pieces of corresponding-difference-value information with each other and calculates comparison result information on the comparison.

[Item 8]

The information processing method according to Item 7, in which the comparison result information is acquired in a form of displacement information on displacements between the pieces of reference-difference-value information and the pieces of corresponding-difference-value information acquired by further calculating differences between values indicated by the pieces of the reference-difference-value information and values indicated by the pieces of the corresponding-difference-value information, and moreover, for example, a flag that indicates whether a displacement falls within or outside a permissible range may be provided based on permissible range information for displacement, the permissible range information being set by a user.

[Item 9]

The information processing method according to Item 8, further including a step of comparing, by the difference-value-information comparison unit, permissible range information for displacement with the displacement information, the permissible range information being set by a user, and displaying at least a part of corresponding three-dimensional model data using different colors in accordance with whether the displacement information falls within or outside of a permissible range.

[Item 10]

An information processing system including:

a three-dimensional-model-data acquisition unit that acquires reference three-dimensional model data and corresponding three-dimensional model data from a reference object and a measurement object with a sensor;

a reference-point-coordinate acquisition unit that acquires any number of pieces of reference-point-coordinate information from the reference three-dimensional model data, the any number being three or more;

a reference-search-range setting unit that sets a reference search range based on the reference-point-coordinate information; and a corresponding-point-coordinate-information acquisition unit that acquires corresponding-point-coordinate information within the reference search range, in the corresponding three-dimensional model data.

[Item 11]

A program for causing a computer to execute, as an information processing method:

a step of acquiring reference three-dimensional model data from a reference object with a sensor;

a step of acquiring, by a reference-point-coordinate acquisition unit, any number of pieces of reference-point-coordinate information from the reference three-dimensional model data, the any number being three or more;

a step of acquiring corresponding three-dimensional model data from a measurement object with the sensor;

a step of setting, by a reference-search-range setting unit, a reference search range based on the reference-point-coordinate information; and a step of acquiring, by a corresponding-point-coordinate-information acquisition unit, corresponding-point-coordinate information within the reference search range, in the corresponding three-dimensional model data;

Details of Embodiment 1

A specific example of an information processing system 100 according to an embodiment of the present invention will be described below with reference to the drawings. Note that the present invention is not limited to the exemplification but by the scope of claims, and the equivalents of the scope of claims and all modifications within the scope of claims will be construed as being included in this invention. In the following description, the same or similar constituent elements will be denoted by similar reference characters and similar names, and in the description of each embodiment, redundant description of the same or similar constituent elements may be omitted. Features described in each embodiment can be applied to another embodiment unless the features cause inconsistency in the other embodiment.

FIG. 1 is a diagram illustrating an example of the information processing system 100 in the present embodiment. As illustrated in FIG. 1, the information processing system 100 in the present embodiment includes a terminal 1, an operation robot 2, and a controller 3. The operation robot 2 includes at least an arm 21, a tool 22, and a sensor 23. The terminal 1 and the controller 3 are connected to the operation robot 2 in a wired or wireless manner so that the terminal 1 and the controller 3 can mutually communicate with the operation robot 2.

<Terminal 1>

Figure 2:
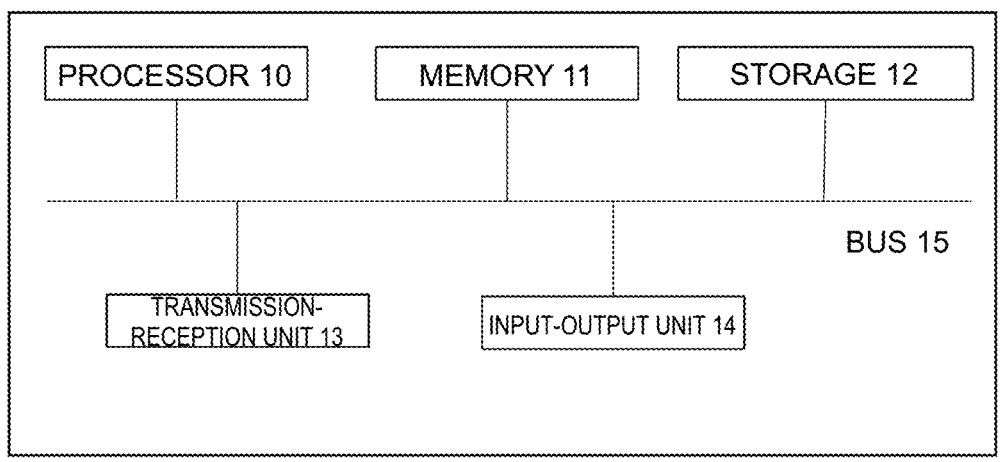
FIG. 2 is a diagram illustrating a hardware configuration example of a terminal 1 according to Embodiment 1 being the present embodiment.

FIG. 2 is a diagram illustrating a hardware configuration of the terminal 1. The terminal 1 may be a general-purpose computer such as a personal computer or may be logically implemented in cloud computing. Note that the illustrated configuration is merely an example, and the terminal 1 may have another configuration. For example, some functions provided in a processor 10 of the terminal 1 may be executed by an external server or another terminal.

The terminal 1 includes at least the processor 10, a memory 11, a storage 12, a transmission-reception unit 13, an input-output unit 14, and the like, which are electrically connected to one another through a bus 15.

The processor 10 is an arithmetic unit that controls the entire operation of the terminal 1, performing at least controlling of exchanging data and the like with the operation robot 2, information processing necessary for execution of an application and authentication processing, and the like. For example, the processor 10 includes a central processing unit (CPU) and/or a graphics processing unit (GPU) and executes a program and the like for this system that have been stored in the storage 12 and loaded onto the memory 11 to perform various types of information processing.

The memory 11 includes a main memory including a volatile storage device such as a dynamic random access memory (DRAM) and an auxiliary memory including a nonvolatile storage device such as a flash memory and a hard disc drive (HDD). The memory 11 is used as a work area and the like for the processor 10 and stores a Basic Input/Output System (BIOS) that is executed when the terminal 1 starts up, various types of setting information, and the like.

The storage 12 stores various types of programs such as application programs. A database that stores data to be used for various types of processing may be built in the storage 12.

The transmission-reception unit 13 connects the terminal 1 at least to the operation robot 2 and exchanges data and the like under instructions issued by the processor. The transmission-reception unit 13 is adapted for wired or wireless communication; when adapted for wireless communication, the transmission-reception unit 13 may include a short-range communication interface such as WiFi, Bluetooth®, and Bluetooth Low Energy (BLE).

The input-output unit 14 includes, for example, an information output device (e.g., display) and an information input device (e.g., keyboard or mouse) when the terminal 1 is provided in a form of a personal computer or includes, for example, an information input-output apparatus such as touch panel when the terminal is provided in a form of a smartphone or a tablet terminal.

The bus 15 is connected to the above constituent elements in the same manner and transmits, for example, address signals, data signals, and various types of control signals.

<Operation Robot 2>

Referring back to FIG. 1, the operation robot 2 according to the present embodiment will be described.

As described above, the operation robot 2 includes the arm 21, the tool 22, and the sensor 23. Note that the illustrated configuration is merely an example, and the operation robot 2 is not limited to this configuration.

Operation of the arm 21 is controlled by the terminal 1 based on a three-dimensional robot coordinate system. The arm 21 may further include the controller 3, which is connected to the operation robot 2 in a wired or wireless manner, and the operation of the arm 21 may be controlled by the operation robot 2 and the controller 3.

Operation of the tool 22 is controlled by the terminal 1 based on a three-dimensional tool coordinate system. A configuration of the tool 22 may have any tool in accordance with its use; the tool 22 may be, for example, a welding torch, a paint spraying device for coating, a grinding device, a drilling device, a grinding device, or the like.

Figure 4:
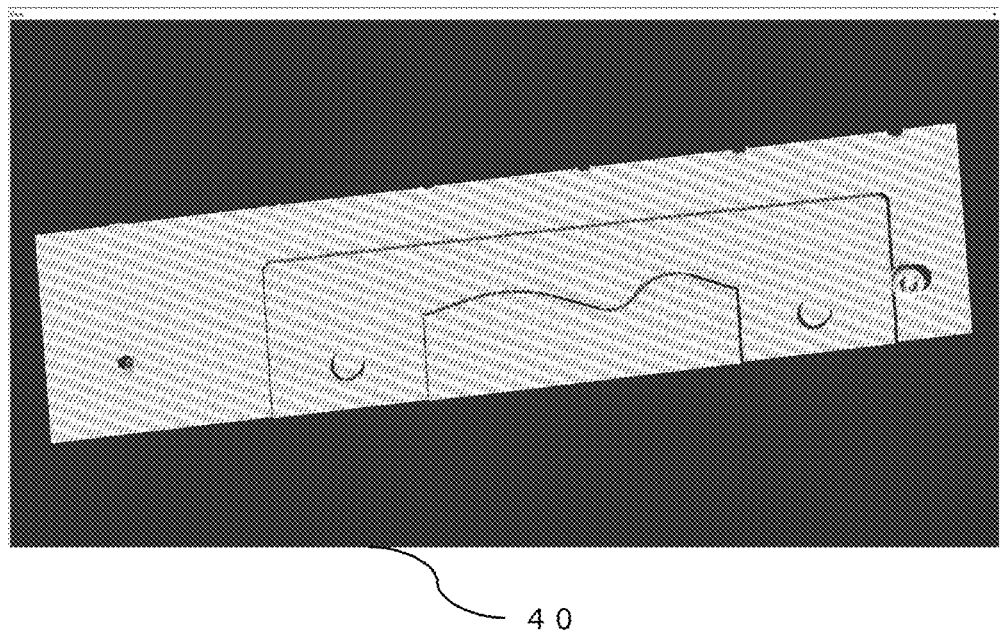
FIG. 4 is a diagram illustrating a display example of three-dimensional model data according to Embodiment 1 being the present embodiment.
Figure 5:
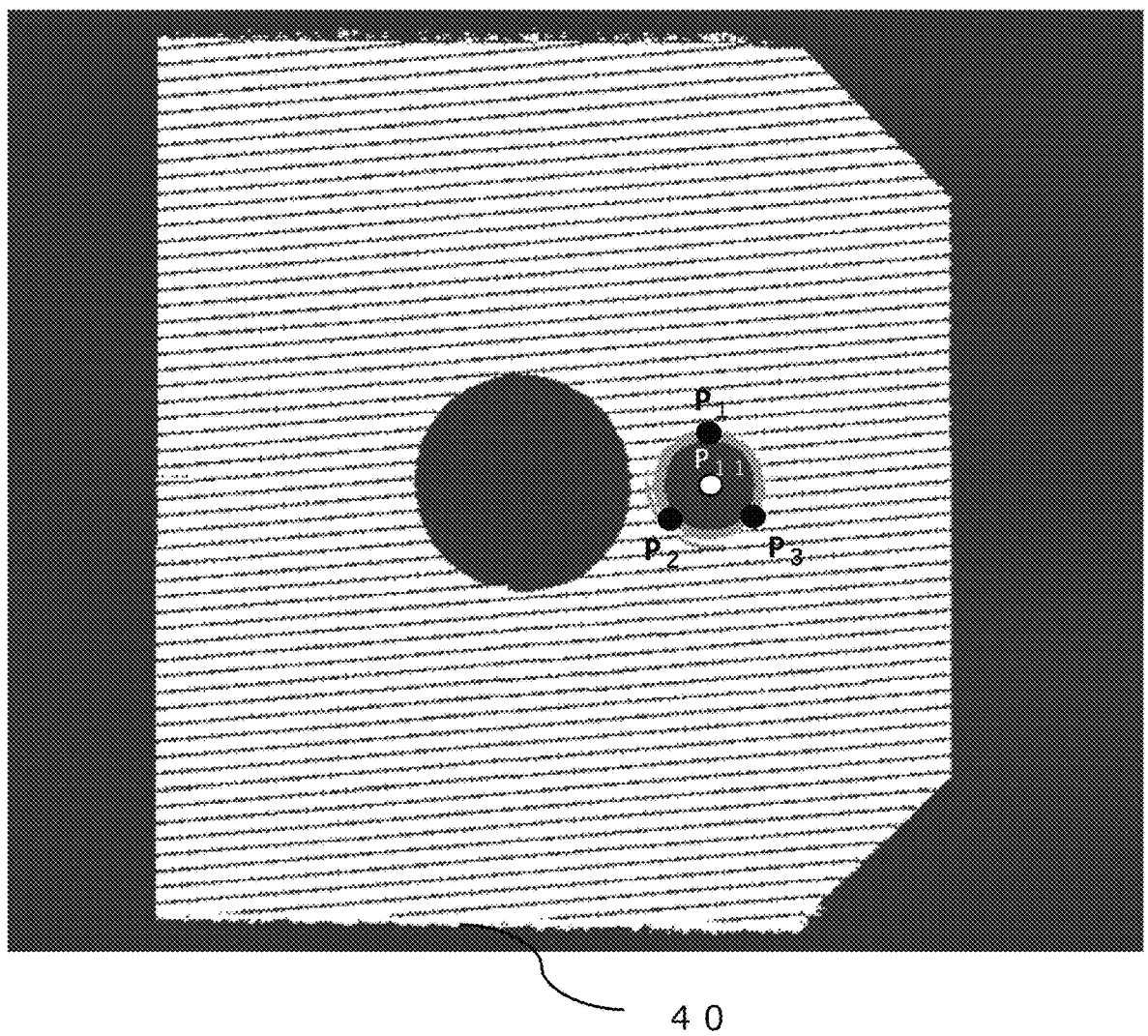
FIG. 5 is a diagram illustrating an example of a specific-shape-portion detection according to Embodiment 1 being the present embodiment.

The sensor 23 performs sensing on an object based on a three-dimensional sensor coordinate system. The sensor 23 is, for example, a laser sensor that operates as a three-dimensional scanner, and the sensor 23 acquires three-dimensional model data 40 of the object by sensing. The three-dimensional model data 40 is, for example, three-dimensional point cloud data such as illustrated in FIG. 4 and FIG. 5, in which point data items each has a piece of coordinate information in the sensor coordinate system, and the point cloud enables grasping a shape of an object. The sensor 23 is not limited to a laser sensor and may be any sensor capable of acquiring coordinate information in the three-dimensional sensor coordinate system; for example, the sensor 23 may be an image sensor of a stereo type or the like or may be a sensor independent of the operation robot. For concrete description, a configuration in which three-dimensional point cloud data is used as the three-dimensional model data 40 will be described below as an example.

Note that there may be a configuration in which predetermined calibration is performed before an operation to associate the robot coordinate system, the tool coordinate system, and the sensor coordinate system with one another, for example, a user specifies a position (coordinates) based on the sensor coordinate system, so that operation of the arm 21 and the tool 22 is controlled based on corresponding positions.

<Functions of Terminal 1>

Figure 3:
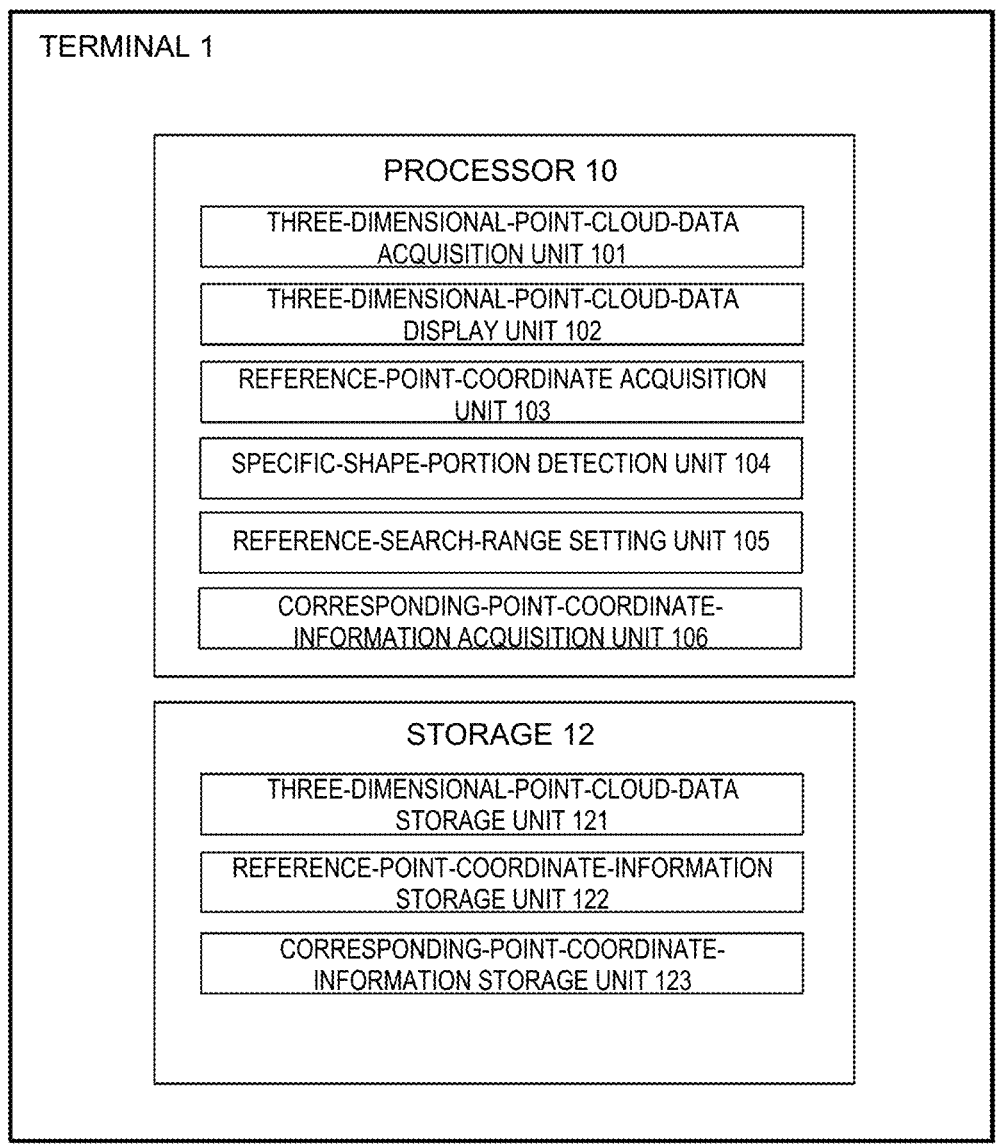
FIG. 3 is a diagram illustrating a functional configuration example of the terminal 1 according to Embodiment 1 being the present embodiment.

FIG. 3 is a block diagram illustrative of functions implemented in the terminal 1. In the present embodiment, the processor 10 of the terminal 1 includes a three-dimensional-model-data acquisition unit (three-dimensional-point-cloud-data acquisition unit) 101, a three-dimensional-model-data display unit (three-dimensional-point-cloud-data display unit) 102, a reference-point-coordinate acquisition unit 103, a specific-shape-portion detection unit 104, a reference-search-range setting unit 105, and a corresponding-point-coordinate-information acquisition unit 106. The storage 12 of the terminal 1 includes a three-dimensional-model-data storage unit (three-dimensional-point-cloud-data storage unit) 121, a reference-point-coordinate-information storage unit 122, and a corresponding-point-coordinate-information storage unit 123.

The three-dimensional-point-cloud-data acquisition unit 101 performs, for example, controlling of the operation robot 2 and acquisition of three-dimensional point cloud data on an object with the sensor 23 under instructions from the input-output unit 14 of the terminal 1. The obtained three-dimensional point cloud data is, for example, three-dimensional coordinate information data based on the sensor coordinate system and is stored in the three-dimensional-point-cloud-data storage unit 121.

The three-dimensional-point-cloud-data display unit 102 causes the input-output unit 14 of the terminal 1 to display the three-dimensional point cloud data acquired by the three-dimensional-point-cloud-data acquisition unit 101, as illustrated in FIG. 4, for example. A user can visually check the displayed three-dimensional point cloud data from any direction. In this case, as described above, the input-output unit 14 includes, for example, an information output device (e.g., display) and an information input device (e.g., keyboard or mouse) when the terminal 1 is provided in a form of a personal computer or includes, for example, an information input-output apparatus such as touch panel when the terminal is provided in a form of a smartphone or a tablet terminal, and the any direction above can be specified with the input-output unit 14.

Figure 7:
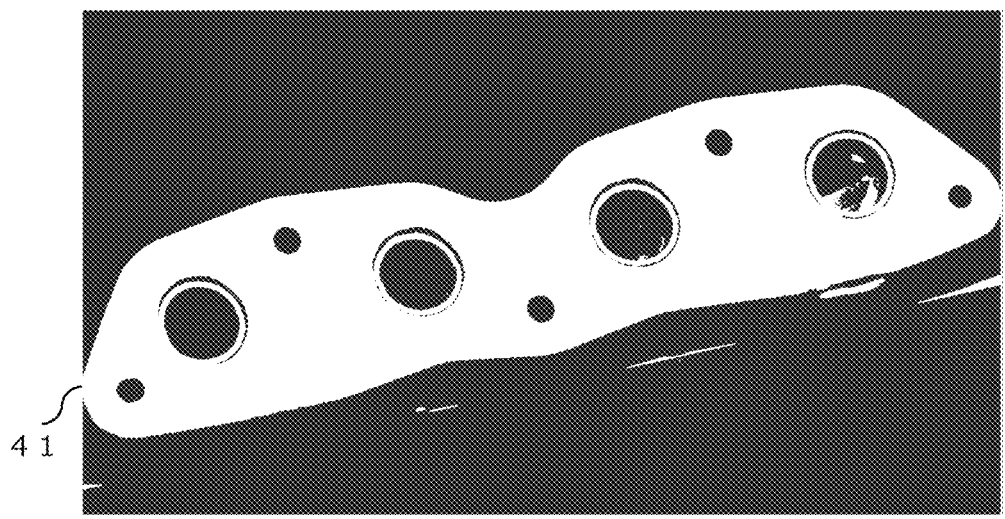
FIG. 7 is a diagram illustrating a display example of reference three-dimensional model data according to Embodiment 1 being the present embodiment.

The reference-point-coordinate acquisition unit 103 acquires a given number of pieces of reference-point-coordinate information in response to, for example, a predetermined operation by a user, based on reference three-dimensional model data 41 (e.g., reference three-dimensional point cloud data) as illustrated in FIG. 7 and the like. As a concrete example, three pieces of information including, for example, reference origin coordinate information on an origin, X reference-point-coordinate information on a starting point in an X direction from the origin, and Y reference-point-coordinate information on a starting point in a Y direction from the origin may be obtained. A method of acquiring each type of reference coordinate information may be, for example, a method in which a user uses the input-output unit 14 of the terminal 1 to directly select a predetermined point from the reference three-dimensional point cloud data 41 displayed on the three-dimensional-point-cloud-data display unit 102 or a method that allows a predetermined point in a portion with a specific shape on a reference object to be determined by a predetermined calculation. The portion with the specific shape may be, for example, a hole (hole portion) or a projection with a conical shape, a columnar shape, or the like. Examples of a method for the predetermined calculation include a method that may include detecting the hole (hole portion) by a method described later and determining center coordinate information on the hole to be the reference coordinate information, and a method that may include determining tip portion coordinate information on the projection to be the reference coordinate information by a known method. However, the above is not limitative, a portion with any shape that is uniquely determined particularly by calculation can be regarded as the portion with the specific shape. The acquired pieces of reference-point-coordinate information are stored in the reference-point-coordinate-information storage unit 122.

The specific-shape-portion detection unit 104 detects a portion with a specific shape in the reference three-dimensional point cloud data 41 in response to, for example, a predetermined operation by a user, and acquires reference coordinate information from the portion. As a specific example, as illustrated in FIG. 5 for example, the terminal 1 acquires pieces of coordinate information $P_1$ to $P_3$ on any three points in the vicinity of a hole provided on a predetermined plane surface of an object in the three-dimensional point cloud data 40 (reference three-dimensional point cloud data 41) and calculates hole-center-coordinate information $P_{11}$ from the pieces of coordinate information on the three points. As a more specific example, the specific-shape-portion detection unit 104 calculates, for example, provisional-circle-center-coordinate information from the pieces of coordinate information $P_1$ to $P_3$ on the three points in the vicinity of the hole by use of perpendicular bisectors or the like, sets a columnar search range with a predetermined height, from a circle passing through the three points and the provisional-circle-center-coordinate information, and derives outline coordinate information on the hole by applying a known edge detection method to the three-dimensional point cloud data within the search range. Based on the outline coordinate information, the specific-shape-portion detection unit 104 calculates the hole-center-coordinate information $P_{11}$ by a known calculation (e.g., least squares fitting of circles, etc.).

The reference-search-range setting unit 105 sets, based on the pieces of reference-point-coordinate information, a reference search range for acquiring pieces of corresponding-point-coordinate information in other measurement object model data 51 (e.g., other three-dimensional point cloud data) that correspond to the pieces of reference-point-coordinate information. For example, in a case where the columnar search range has been already generated by the specific-shape-portion detection unit 104, the columnar search range may be set as the reference search range, or a reference search range with any three-dimensional shape (solid shape) such as a sphere, a cube, a rectangular parallelepiped, a prism, a column, and an ellipsoid that are centered about a point indicated by the reference-point-coordinate information may be set.

Based on the reference search range that has been set to the other measurement object model data 51 (e.g., the other three-dimensional point cloud data), the corresponding-point-coordinate-information acquisition unit 106 acquires the pieces of corresponding-point-coordinate information in the measurement object model data 51. The acquired pieces of corresponding-point-coordinate information are stored in the corresponding-point-coordinate-information storage unit 123.

<Flowchart of Information Processing Method>

Figure 6:
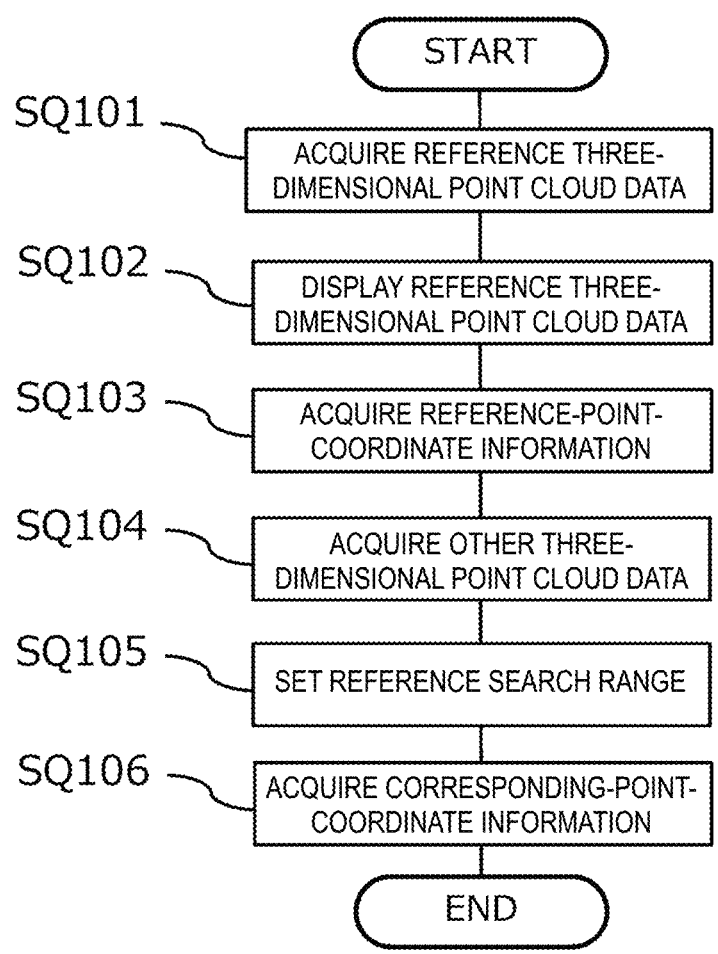
FIG. 6 is a diagram illustrating a flowchart example of an information processing method according to Embodiment 1 being the present embodiment.

FIG. 6 illustrates an example of a flowchart of an information processing method by the information processing system 100 in Embodiment 1 being the present embodiment.

First, a user acquires reference three-dimensional point cloud data 41 on, for example, a reference object positioned on a worktable with the sensor 23 under control by the three-dimensional-point-cloud-data acquisition unit 101 of the terminal 1 (SQ101).

Next, as illustrated in FIG. 7, the reference three-dimensional point cloud data 41 acquired by the three-dimensional-point-cloud-data display unit 102 is displayed on the terminal 1 (SQ102).

Figure 8:
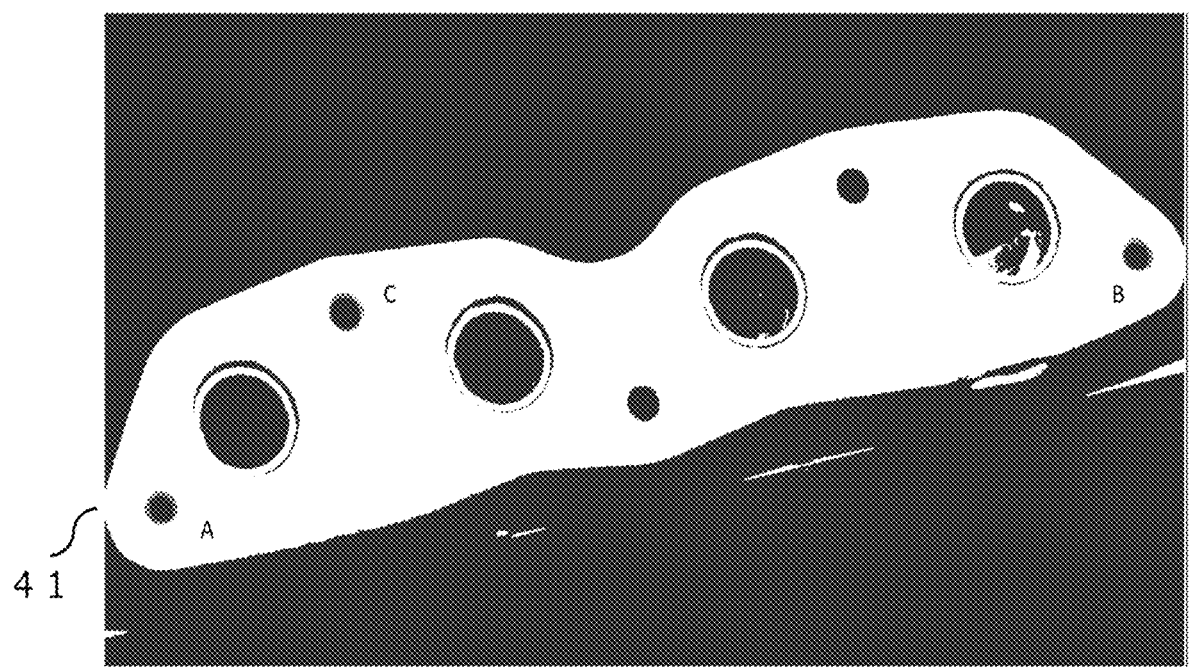
FIG. 8 is a diagram illustrating a display example of the reference three-dimensional model data according to Embodiment 1 being the present embodiment.

Next, the reference-point-coordinate acquisition unit 103 acquires a given number of pieces of reference-point-coordinate information in response to, for example, a predetermined operation by a user, based on the reference three-dimensional point cloud data 41 (SQ103). At that time, as illustrated in FIG. 8, the specific-shape-portion detection unit 104 may detect portions (holes) with a specific shape in the reference three-dimensional point cloud data 41 in response to, for example, a predetermined operation by a user, and may acquire center coordinates of each of holes A to C, which are the reference coordinate information, from the portions.

Here, the user next acquires three-dimensional point cloud data 51 on, for example, another measurement object positioned on a worktable (note that the measurement object is an object having the same or substantially the same shape as the reference object above, an object akin or similar to the reference object above, or an object of the same type or the same model as the reference object above) with the sensor 23 under control by the three-dimensional-point-cloud-data acquisition unit 101 of the terminal 1 (SQ104).

Next, the reference-search-range setting unit 105 sets, based on the pieces of reference-point-coordinate information, the reference search range for acquiring the pieces of corresponding-point-coordinate information in the other measurement object model data 51 (e.g., the other three-dimensional point cloud data) that correspond to the pieces of reference-point-coordinate information (SQ105). At that time, for example, the reference-search-range setting unit 105 sets a columnar search range generated by the specific-shape-portion detection unit 104 as the reference search range.

Figure 9:
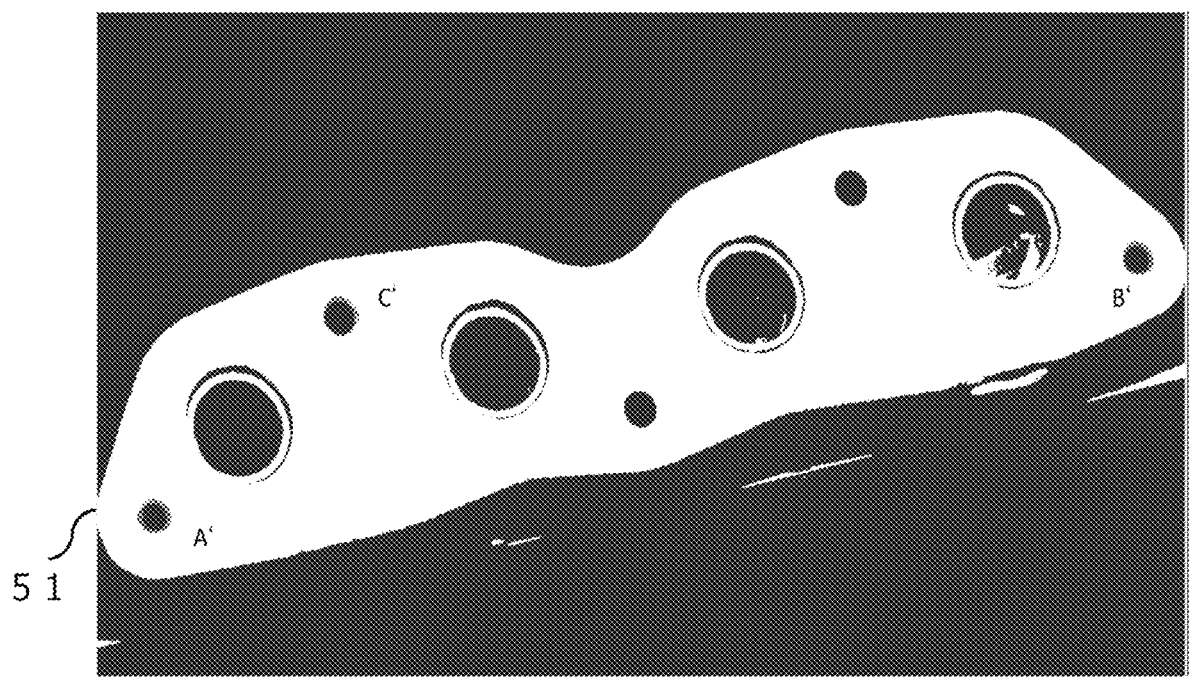
FIG. 9 is a diagram illustrating a display example of corresponding three-dimensional model data according to Embodiment 1 being the present embodiment.

Next, as illustrated in FIG. 9, based on the reference search range that has been set to the other three-dimensional point cloud data, the corresponding-point-coordinate-information acquisition unit 106 acquires center coordinates of each of holes A' to C', which are the corresponding-point-coordinate information in the other three-dimensional point cloud data (SQ106).

This brings about a state in which the three pieces of reference-point-coordinate information and the three pieces of corresponding-point-coordinate information based on the same specific-shape portion are acquired in the reference three-dimensional point cloud data and the other three-dimensional point cloud data, respectively. As described above, these three pieces of coordinate information can be, for example, reference origin coordinate information on the origin, X reference-point-coordinate information on the starting point in an X direction from the origin, and Y reference-point-coordinate information on the starting point in a Y direction from the origin may be obtained, and thus, by using these pieces of coordinate information, it is possible to set a sensor coordinate system (XYZ coordinate system) in which the same position is determined to be its origin for objects.

Figure 10:
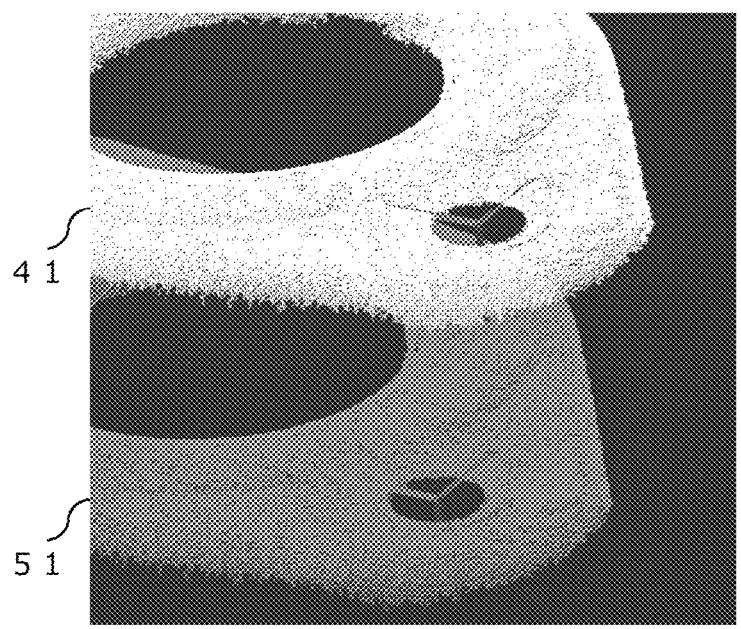
FIG. 10 is a diagram describing a concept of fitting according to Embodiment 1 being the present embodiment.

Therefore, the information processing system 100 according to Embodiment 1 being the present embodiment applies the reference search range based on the reference-point-coordinate information used for setting the sensor coordinate system (XYZ coordinate system) in the reference three-dimensional model data (particularly, the reference three-dimensional point cloud data) to the other three-dimensional model data, in place of conventional fitting by associating three-dimensional model data items with one another, so that corresponding-point-coordinate information can be derived according to the same rule. As a result, as illustrated in FIG. 10, by setting a sensor coordinate system in which the same position is taken as its origin for the objects, the objects are substantially subjected to fitting.

Details of Embodiment 2

In Embodiment 2, its system configuration and its fitting method are the same as those described in Embodiment 1 above, and thus the description thereof will be omitted. In Embodiment 2 being the present embodiment, an example of a configuration with which, after the fitting, three-dimensional model data (reference three-dimensional point cloud data) on a reference object and three-dimensional model data on another measurement object (other three-dimensional point cloud data) are compared with each other in shape will be described.

Figure 11:
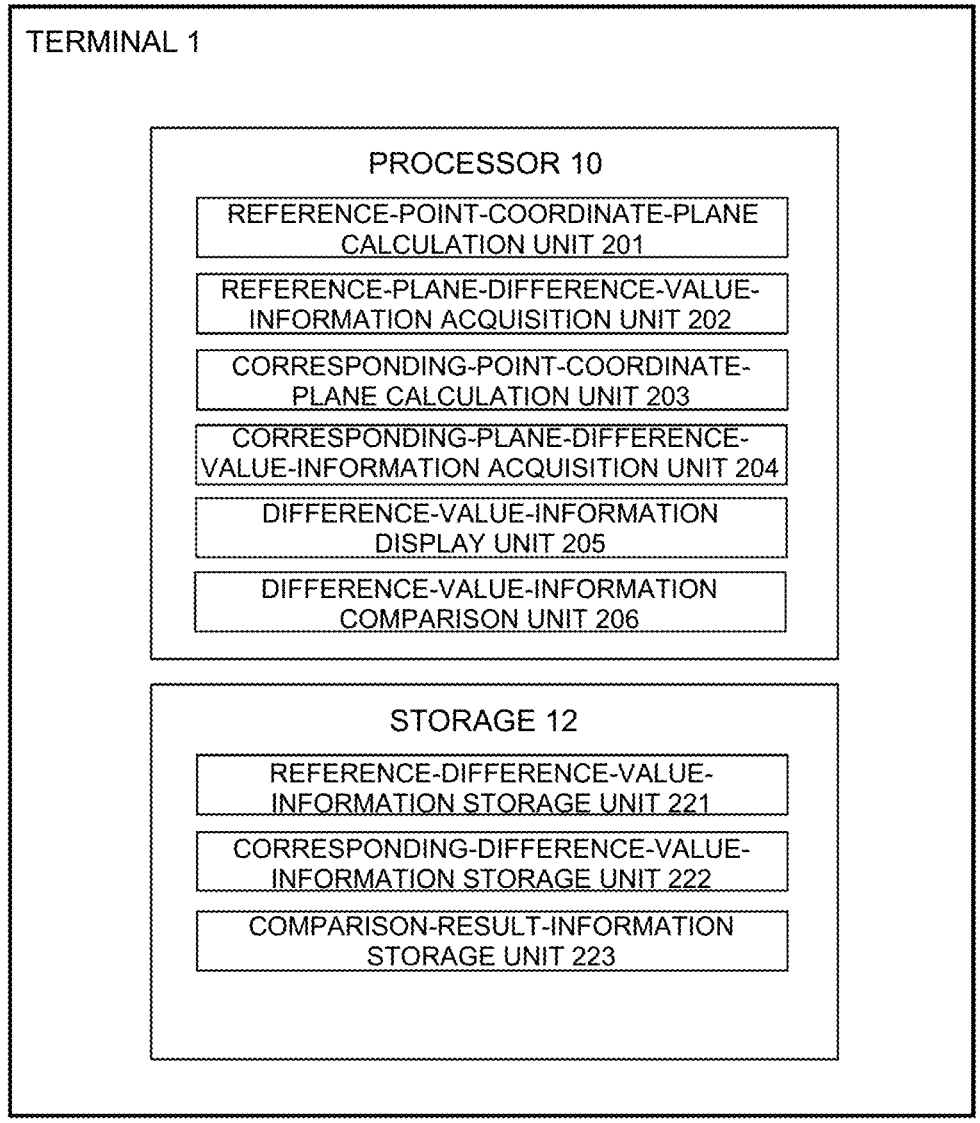
FIG. 11 is a diagram illustrating a functional configuration example of a terminal 1 according to Embodiment 2 being the present embodiment.

FIG. 11 is a block diagram illustrative of functions implemented in a terminal 1 and is a block diagram that is illustrative of functions relating to Embodiment 2 being the present embodiment and from which the functions illustrated in the FIG. 3 are not illustrated. In Embodiment 2 being the present embodiment, a processor 10 of the terminal 1 further includes a reference-point-coordinate-plane calculation unit 201, a reference-plane-difference-value-information acquisition unit 202, a corresponding-point-coordinate-plane calculation unit 203, a corresponding-plane-difference-value-information acquisition unit 204, a difference-value-information display unit 205, and a difference-value-information comparison unit 206. A storage 12 of the terminal 1 includes a reference-difference-value-information storage unit 221, a corresponding-difference-value-information storage unit 222, and a comparison-result-information storage unit 223.

The reference-point-coordinate-plane calculation unit 201 calculates, based on acquired reference-point-coordinate information, a reference plane (XY plane) including a reference point indicated by the reference-point-coordinate information, using a known calculation method. For example, in a three-dimensional coordinate system, at least three pieces of reference-point-coordinate information on three points enable determination of an XY plane in an XYZ coordinate system. As a range of the reference plane, for example, a range of infinite plane may be set, a plane range including the entire object may be set based on three-dimensional point cloud data, or a range partly including the object may be set by a user based on coordinate information in the sensor coordinate system.

The reference-plane-difference-value-information acquisition unit 202 makes a setting such that the reference plane has a reference value (e.g., zero) in a predetermined coordinate axis direction (Z-axis direction) and acquires pieces of reference-difference-value information indicating difference values, from the reference value, of reference object model data with respect to the reference plane in the predetermined coordinate axis direction. In a case where, for example, the reference plane is the XY plane, and has a reference value of zero in the Z-axis direction, the pieces of reference-difference-value information are pieces of Z-coordinate information on point data items. The acquired pieces of reference-difference-value information are stored in the reference-difference-value-information storage unit 221.

The corresponding-point-coordinate-plane calculation unit 203 calculates, based on acquired corresponding-point-coordinate information, a corresponding plane (XY plane) including a corresponding point indicated by the corresponding-point-coordinate information, using a known calculation method. For example, in a three-dimensional coordinate system, at least three pieces of corresponding-point-coordinate information on three points enable determination of an XY plane in an XYZ coordinate system. A range of the corresponding plane can be set as with the reference plane and is preferably, but not limited to, the same range as the range of the reference plane.

The corresponding-plane-difference-value-information acquisition unit 204 makes a setting such that the corresponding plane has a reference value (e.g., zero) in a predetermined coordinate axis direction (Z-axis direction) and acquires pieces of corresponding-difference-value information indicating difference values, from the reference value, of measurement object model data with respect to the corresponding plane in the predetermined coordinate axis direction. In a case where, for example, the corresponding plane is the XY plane and has a reference value of zero in the Z-axis direction, the pieces of corresponding-difference-value information are pieces of Z-coordinate information on point data items. The acquired pieces of corresponding-difference-value information are stored in the corresponding-difference-value-information storage unit 222.

Figure 14:
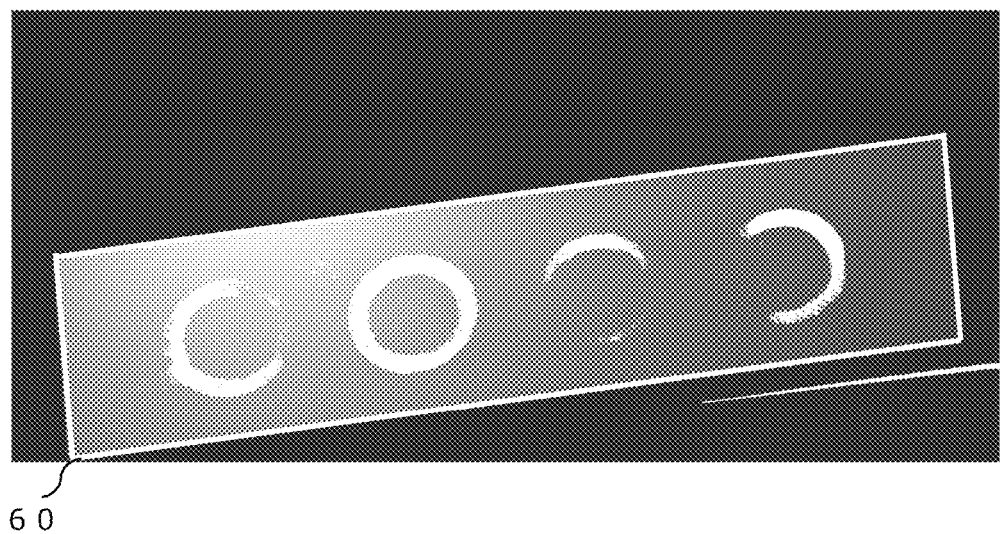
FIG. 14 is a diagram illustrating a display example of difference value information according to Embodiment 2 being the present embodiment.

The difference-value-information display unit 205 causes the input-output unit 14 of the terminal 1 to display pieces of the difference value information indicating difference values with respect to the reference plane or the corresponding plane as illustrated in FIG. 14, for example. As an example of the display, as illustrated in FIG. 14, for example, the reference plane or the corresponding plane may be virtually formed and displayed, and point data items having pieces of difference value information each indicating a difference value that is at least either positive or negative with respect to the reference value may be displayed. In addition, the display may be made such that, for example, the pieces of difference value information may be divided into predetermined numerical ranges, colors are set to the numerical ranges to display the pieces of difference value information (what is called a heat map).

Figure 13:
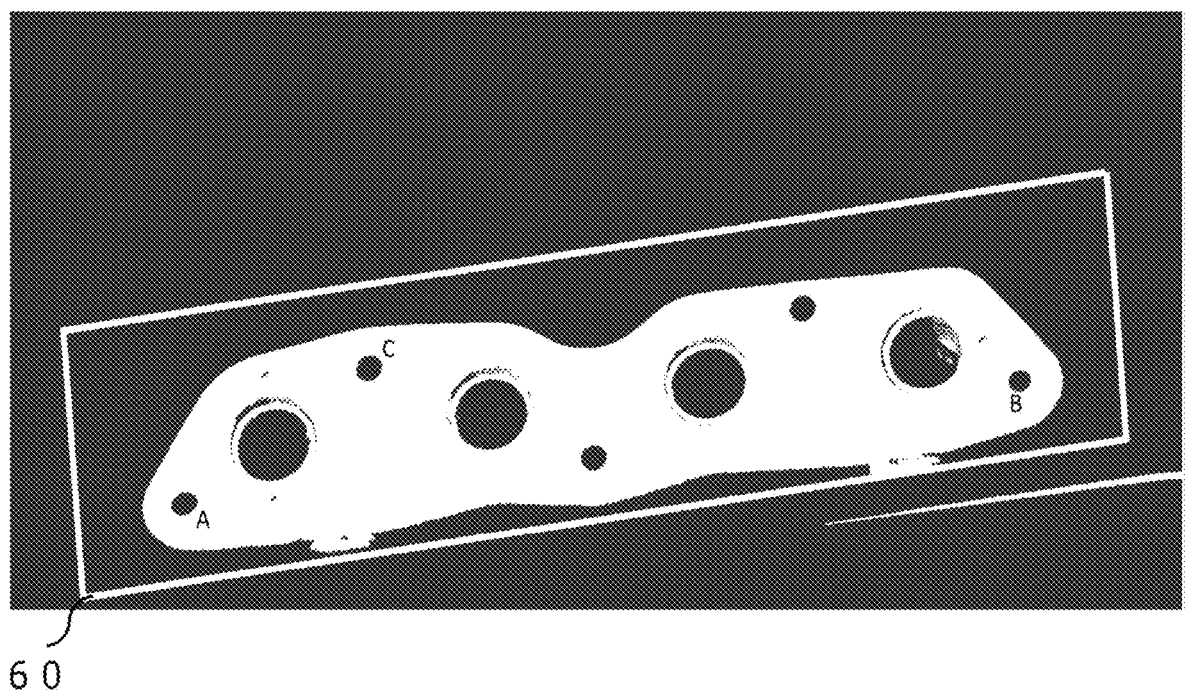
FIG. 13 is a diagram describing an example of a reference search range according to Embodiment 2 being the present embodiment.
Figure 15:
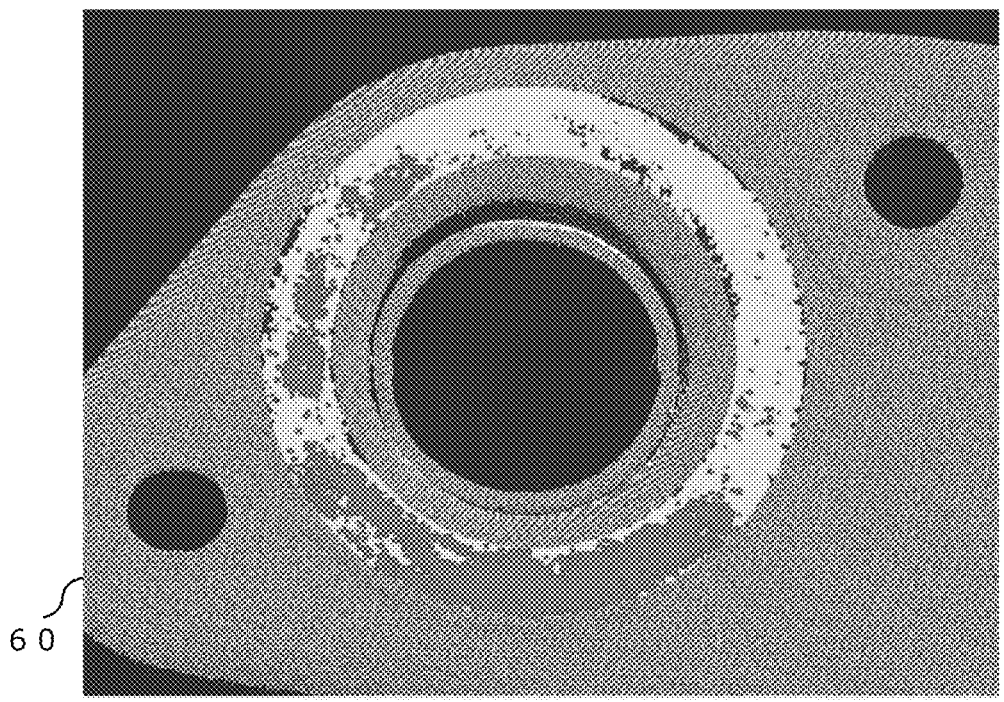
FIG. 15 is a diagram illustrating a display example of comparison result information according to Embodiment 2 being the present embodiment.

The difference-value-information comparison unit 206 compares the pieces of reference-difference-value information and the pieces of corresponding-difference-value information with each other and calculates comparison result information on the comparison. For example, the comparison result information may be acquired in a form of displacement information on displacements between the pieces of reference-difference-value information and the pieces of corresponding-difference-value information acquired by further calculating a difference between a value indicated by a piece of the reference-difference-value information and a value indicated by a piece of the corresponding-difference-value information for each point data item. Moreover, for example, a flag that indicates whether a displacement falls within or outside a permissible range may be set based on permissible range information for displacement, the permissible range information being set by a user. In addition, colors are set for the flag (e.g., as illustrated in FIG. 15, green is set for an OK case where a displacement falls within the permissible range, red is set for an NG case where a displacement falls outside the permissible range, additionally, red is set for a case where a displacement falls outside the permissible range and lies on a positive side, and blue is set for a case where a displacement falls outside the permissible range and lies on a negative side), and the colors may be reflected on display that is illustrated in FIG. 13 or FIG. 14. The calculated comparison result information is stored in the comparison-result-information storage unit 223.

<Flowchart of Information Processing Method>

Figure 12:
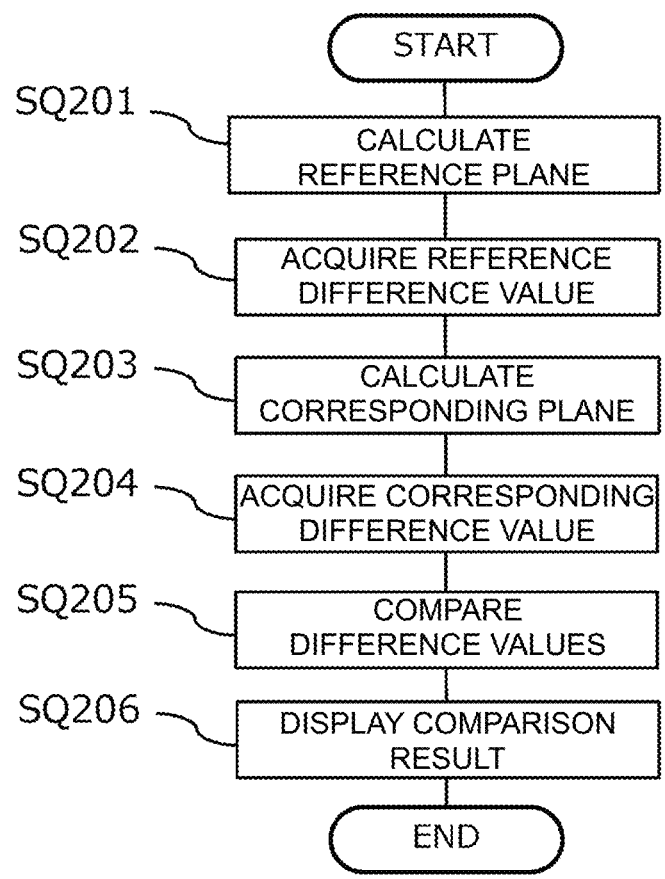
FIG. 12 is a diagram illustrating a flowchart example of an information processing method according to Embodiment 2 being the present embodiment.

FIG. 12 illustrates an example of a flowchart of an information processing method by the information processing system 100 in Embodiment 2 being the present embodiment.

First, the reference-point-coordinate-plane calculation unit 201 calculates, based on acquired reference-point-coordinate information, the reference plane (XY plane) including a reference point indicated by the reference-point-coordinate information (SQ201). For example, a plane range including the entire object is set as illustrated in FIG. 13.

Next, the reference-plane-difference-value-information acquisition unit 202 makes a setting such that the reference plane has a reference value (e.g., zero) in a predetermined coordinate axis direction (Z-axis direction) and acquires reference difference values (e.g., pieces of Z-coordinate information on point data items), from the reference value, of the reference object model data with respect to the reference plane in the predetermined coordinate axis direction (SQ202). At that time, the difference-value-information display unit 205 may cause the input-output unit 14 of the terminal 1 to display pieces of the reference-difference-value information indicating difference values with respect to the reference plane as illustrated in FIG. 14, for example.

Next, the corresponding-point-coordinate-plane calculation unit 203 calculates, based on acquired corresponding-point-coordinate information, a corresponding plane (XY plane) including a corresponding point indicated by the corresponding-point-coordinate information (SQ203). For example, the same range as the range of the reference plane, such as illustrated in FIG. 13, is set.

Next, the corresponding-plane-difference-value-information acquisition unit 204 makes a setting such that the corresponding plane has a reference value (e.g., zero) in a predetermined coordinate axis direction (Z-axis direction) and acquires corresponding difference values (e.g., pieces of Z-coordinate information on point data items) pieces of corresponding-difference-value information indicating difference values, from the reference value, of measurement object model data with respect to the corresponding plane in the predetermined coordinate axis direction (SQ204). At that time, the difference-value-information display unit 205 may cause the input-output unit 14 of the terminal 1 to display pieces of the corresponding-difference-value information indicating difference values with respect to the corresponding plane as illustrated in FIG. 14, for example.

The difference-value-information comparison unit 206 compares the pieces of reference-difference-value information and the pieces of corresponding-difference-value information with each other and calculates the comparison result information on the comparison (SQ205). Further, the difference-value-information comparison unit 206 may acquire, for example, the displacement information on displacements between the reference-difference-value information and the corresponding-difference-value information, and the displacement information may be compared with the permissible range information and displayed with colors in accordance with whether a displacement falls within or outside the permissible range, as illustrated in FIG. 15 (SQ205).

Therefore, in the information processing system 100 according to Embodiment 2 being the present embodiment, the sensor coordinate system in which the same position is taken as its origin for objects is set by the configuration in Embodiment 1 being the present embodiment, so that differences can be checked using, for example, the same plane as a reference position. Moreover, since it is possible to easily calculate displacements between the reference-difference-value information and the corresponding-difference-value information, and it is thus possible to easily compare the shape of the measurement object with the shape of the reference object.

The present embodiments are described above. However, these embodiments are for facilitating understanding of the present invention and should not be construed as limiting the present invention. The present invention can be modified and improved without departing from the gist thereof, and equivalents of the modification and improvement are included in the present invention.

REFERENCE SIGNS LIST 1 terminal
2 operation robot
21 arm
22 tool
23 sensor
3 controller

What is claimed is:

1. An information processing method comprising:
   a step of acquiring reference three-dimensional model data from a reference object with a sensor;
   a step of acquiring, by a reference-point-coordinate acquisition unit, any number of pieces of reference-point-coordinate information from the reference three-dimensional model data, the any number being three or more;
   a step of acquiring corresponding three-dimensional model data from a measurement object with the sensor;
   a step of setting, by a reference-search-range setting unit, a three-dimensional reference search range based on the any number of pieces of reference-point-coordinate information;
   a step of acquiring, by a corresponding-point-coordinate-information acquisition unit, any number of pieces of corresponding-point-coordinate information that respectively corresponds to the any number of pieces of reference-point-coordinate information within the three-dimensional reference search range, from three-dimensional point cloud data that forms the corresponding three-dimensional model data;
   a step of calculating, by a corresponding-point-coordinate-plane calculation unit, a corresponding plane using the any number of pieces of corresponding-point-coordinate information, the corresponding plane including corresponding point coordinates in the corresponding three-dimensional model data; and
   a step of making, by a corresponding-plane-difference-value-information acquisition unit, a setting such that the corresponding plane has a reference value in a predetermined coordinate axis direction and acquires pieces of corresponding-difference-value information indicating difference values, from the reference value, of the corresponding three-dimensional model data with respect to the corresponding plane in the predetermined coordinate axis direction.

2. The information processing method according to claim 1, wherein the three-dimensional model data is three-dimensional point cloud data.

3. The information processing method according to claim 1, wherein the step of acquiring the reference-point-coordinate information includes a step of detecting, by a specific-shape-portion detection unit, a portion with a specific shape in the reference three-dimensional model data to acquire coordinate information on the portion as reference-point-coordinate information.

4. The information processing method according to claim 1, further comprising:
   a step of calculating, by a reference-point-coordinate-plane calculation unit, a reference plane using the any number of pieces of reference-point-coordinate information, the reference plane including reference point coordinates in the reference three-dimensional model data; and
   a step of making, by a reference-plane-difference-value-information acquisition unit, a setting such that the reference plane has a reference value in a predetermined coordinate axis direction and acquires pieces of reference-difference-value information indicating difference values, from the reference value, of the reference three-dimensional model data with respect to the reference plane in the predetermined coordinate axis direction.

5. The information processing method according to claim 4, further comprising a step of comparing, by a difference-value-information comparison unit, the pieces of reference-difference-value information and the pieces of corresponding-difference-value information with each other and calculates comparison result information on the comparison.

6. The information processing method according to claim 5, wherein the comparison result information is acquired in a form of displacement information on displacements between the pieces of reference-difference-value information and the pieces of corresponding-difference-value information acquired by further calculating differences between values indicated by the pieces of the reference-difference-value information and values indicated by the pieces of the corresponding-difference-value information.

7. The information processing method according to claim 6, further comprising a step of comparing, by the difference-value-information comparison unit, permissible range information for displacement with the displacement information, the permissible range information being set by a user, and displaying at least a part of corresponding three-dimensional model data using different colors in accordance with whether the displacement information falls within or outside of a permissible range.

8. An information processing system comprising:
   a three-dimensional-model-data acquisition unit that acquires reference three-dimensional model data and corresponding three-dimensional model data from a reference object and a measurement object with a sensor;
   a reference-point-coordinate acquisition unit that acquires any number of pieces of reference-point-coordinate information from the reference three-dimensional model data, the any number being three or more;

a reference-search-range setting unit that sets a three-dimensional reference search range based on the any number of pieces of reference-point-coordinate information;
a corresponding-point-coordinate-information acquisition unit that acquires any number of pieces of corresponding-point-coordinate information respectively corresponding to the any number of pieces of reference-point-coordinate information within the three-dimensional reference search range, from three-dimensional point cloud data that forms the corresponding three-dimensional model data;
a corresponding-point-coordinate-plane calculation unit that calculates a corresponding plane using the any number of pieces of corresponding-point-coordinate information, the corresponding plane including the corresponding point coordinates in the corresponding three-dimensional model data; and
a corresponding-plane-difference-value-information acquisition unit that makes a setting such that the corresponding plane has a reference value in a predetermined coordinate axis direction and acquires pieces of corresponding-difference-value information indicating difference values, from the reference value, of the corresponding three-dimensional model data with respect to the corresponding plane in the predetermined coordinate axis direction.

* * * * *